United States Patent
Debruin et al.

(10) Patent No.: US 7,912,984 B2
(45) Date of Patent: *Mar. 22, 2011

(54) SYSTEM AND METHOD FOR GENERATING A WIRELESS APPLICATION FROM A WEB SERVICE DEFINITION

(75) Inventors: David Debruin, Guelph (CA); Bryan R. Goring, Wellesley (CA); Daniel Mateescu, Woodbridge (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,248

(22) Filed: Jun. 24, 2010

(65) Prior Publication Data

US 2010/0262951 A1    Oct. 14, 2010

Related U.S. Application Data

(63) Continuation of application No. 11/221,820, filed on Sep. 9, 2005, now Pat. No. 7,769,897.

(60) Provisional application No. 60/672,013, filed on Apr. 18, 2005.

(51) Int. Cl.
*G06F 15/16* (2006.01)

(52) U.S. Cl. .................................... 709/246; 715/239

(58) Field of Classification Search .......... 709/203–247; 707/501.1
See application file for complete search history.

(56) References Cited

U.S. PATENT DOCUMENTS

| | | |
|---|---|---|
| 6,247,048 B1 | 6/2001 | Greer et al. |
| 6,549,773 B1 | 4/2003 | Linden et al. |
| 6,868,441 B2 | 3/2005 | Greene et al. |
| 2001/0047395 A1 | 11/2001 | Szutu |
| 2002/0085020 A1 | 7/2002 | Carroll, Jr. |
| 2002/0103822 A1 | 8/2002 | Miller |
| 2003/0035409 A1 | 2/2003 | Wang et al. |
| 2003/0060896 A9 | 3/2003 | Hulai et al. |
| 2003/0095540 A1 | 5/2003 | Mulligan et al. |
| 2003/0179775 A1 | 9/2003 | Carolan et al. |

(Continued)

FOREIGN PATENT DOCUMENTS

WO    200186427 A2    11/2001

(Continued)

OTHER PUBLICATIONS

"The Web Services (r)evolution: Part 4 Web Services Description Language (WSDL)" Internet Citation, [online] XP002247117 retrieved from the internet: URL: ftp:/www6.software.ibm.com/software/developer/library/ws-peer4.pdf> (retrieved on Jul. 10, 2003).

(Continued)

*Primary Examiner* — Bunjob Jaroenchonwanit
(74) *Attorney, Agent, or Firm* — Ogilvy Renault LLP

(57) ABSTRACT

System and method for creating a wireless application from a web service definition language employs an algorithm that analyzes each message of the web service definition an maps the message to a wireless application message and a wireless application data structure. The message maps are used by a proxy at an edge of a wireless network to convert web service messages to wireless messages, and vice versa.

20 Claims, 11 Drawing Sheets

U.S. PATENT DOCUMENTS

| | | |
|---|---|---|
| 2004/0003033 A1 | 1/2004 | Kamen et al. |
| 2004/0068532 A1 | 4/2004 | Dewing et al. |
| 2004/0073626 A1 | 4/2004 | Major et al. |
| 2005/0028085 A1 | 2/2005 | Irwin et al. |
| 2005/0057560 A1 | 3/2005 | Bibr et al. |
| 2005/0063335 A1 | 3/2005 | Shenfield et al. |
| 2005/0193361 A1 | 9/2005 | Vitanov et al. |
| 2005/0198304 A1 | 9/2005 | Oliver et al. |
| 2005/0210125 A1 | 9/2005 | Li |
| 2006/0088050 A1 | 4/2006 | Kumar et al. |
| 2006/0168095 A1 | 7/2006 | Sharma et al. |

FOREIGN PATENT DOCUMENTS

| | | |
|---|---|---|
| WO | 2004059939 A2 | 7/2004 |
| WO | 2004059957 A2 | 7/2004 |
| WO | 2005027455 A1 | 3/2005 |
| WO | 2005067406 A2 | 7/2005 |

OTHER PUBLICATIONS

Steele, Robert; Khankan, Khaled; and Dillon, Tharam; "Mobile Web Services Discovery and Invocation Through Auto-Generation of Abstract Multimodal Interface", Proceedings of the International Conference on Information Technology: Coding and Computing (ITTC '05).

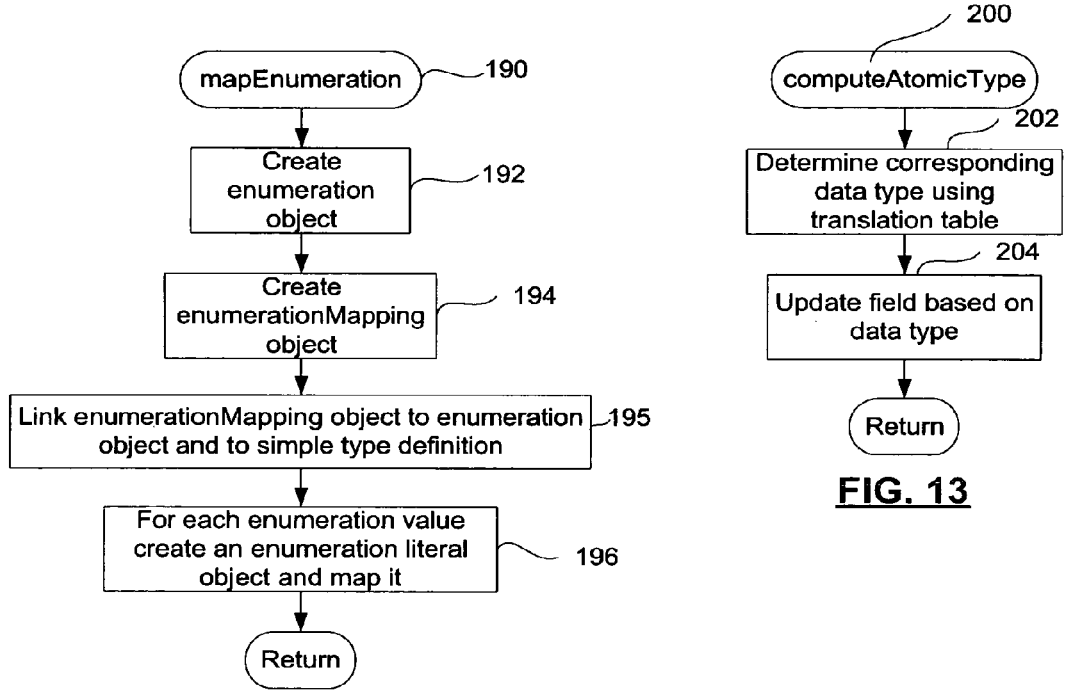
FIG. 12
FIG. 13
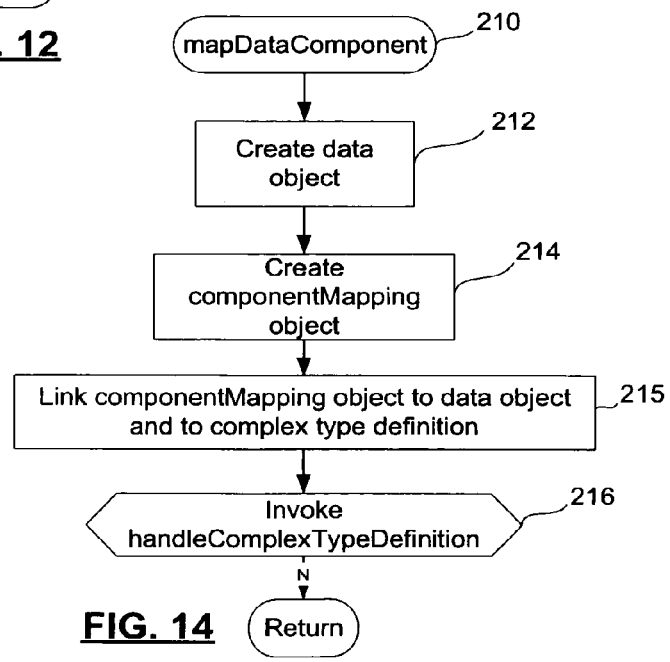
FIG. 14

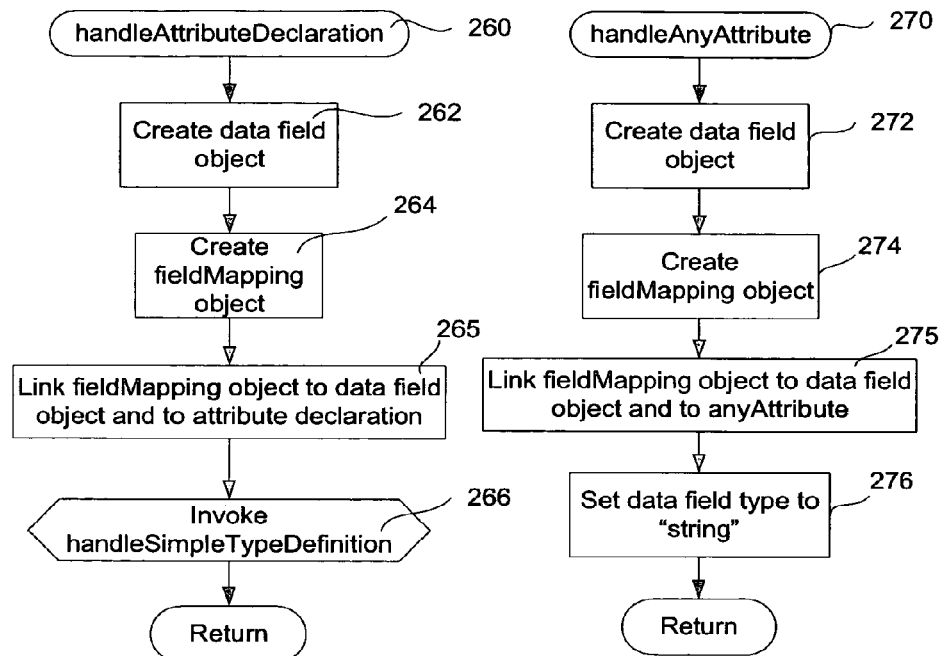
FIG. 16
FIG. 17
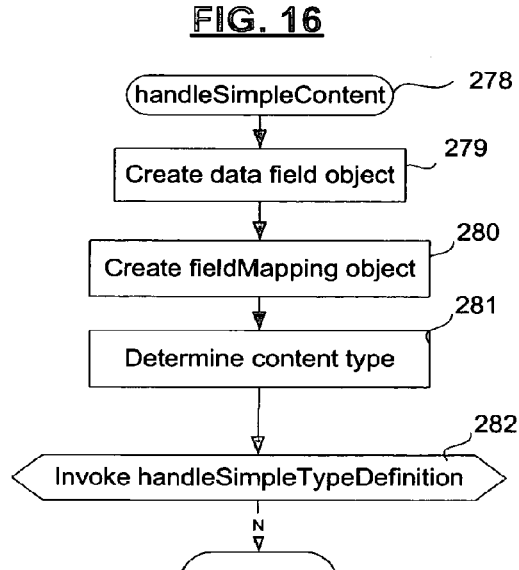
FIG. 18
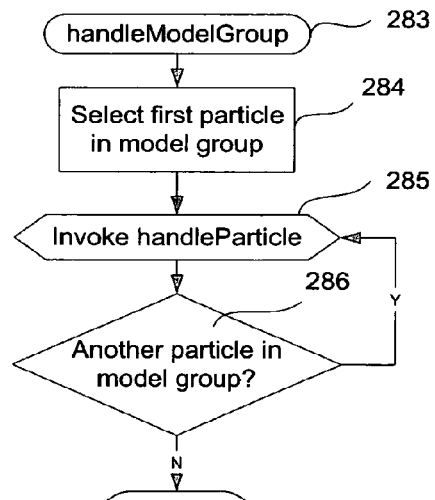
FIG. 20

_US 7,912,984 B2_

SYSTEM AND METHOD FOR GENERATING A WIRELESS APPLICATION FROM A WEB SERVICE DEFINITION

CROSS-REFERENCE TO RELATED APPLICATIONS

This application claims the benefit of priority under §35 U.S.C. 119(e) to U.S. Provisional Patent Application Ser. No. 60/672,013 filed Apr. 18, 2005, the entirety of which is hereby incorporated by reference. This application is a continuation of U.S. patent application Ser. No. 11/221,820, the entirety of which is hereby incorporated by reference.

MICROFICHE APPENDIX

Not Applicable.

TECHNICAL FIELD

This application relates generally to wireless communications applications and wireless communications devices and, in particular, to a method and apparatus for generating a wireless application from a web service definition.

BACKGROUND OF THE INVENTION

The acceptance of wireless devices as a preferred personal communications medium has created a growing demand for such devices. Users of such devices also increasingly expect more functionality and a broader range of services to be made available through such devices. This demand for more functionality requires the development of new applications for wireless devices.

A significant source of information for wireless devices is the Worldwide Web. As is well known, many Worldwide Web services, hereinafter referred to simply as "web services", are available to web enabled devices.

FIG. 1 is a block diagram of a prior art network in which wireless device users 10a, 10b operate wireless devices to send web service request messages via a public domain carrier 12 to an application gateway 14. The application gateway 14 forwards the web service request messages through the internet 16 to an appropriate web service 18a, 18b. The messages are processed by the appropriate web service 18a, 18b and returned through the internet 16 to the application gateway 14. The public domain carrier 12 forwards the response messages to the wireless device operated by users 10a, 10b which processes the response and displays response content to the wireless device users 10a, 10b.

However, web services generally use complex data structures and complex message formats. Complex data structures and complex message formats introduce a significant memory overhead on wireless devices. This impacts the performance of wireless devices and necessitates the development of wireless applications for providing efficient access to the web services.

It is well known that wireless applications for accessing web services from wireless devices can be developed by skilled application developers. It is also known that such application development is time consuming and expensive.

Consequently, there exists a need for a system and method for generating a wireless application from a web service definition.

BRIEF DESCRIPTION OF THE DRAWINGS

Further features and advantages of the present invention will become apparent from the following detailed description, taken in combination with the appended drawings, in which:

FIG. 12 is a flow chart of a mapEnumeration function of the algorithm shown in FIG. 10;

FIG. 13 is a flow chart of a computeAtomicType function of the algorithm shown in FIG. 11;

FIG. 14 is a flow chart of a mapDataComponent function of the algorithm shown in FIG. 9;

FIG. 15b is a continuation of the flow chart shown in FIG. 15a;

FIG. 16 is a flow chart of a handleAttributeDeclaration function of the algorithm shown in FIG. 15b;

FIG. 17 is a flow chart of a handleAnyAttribute function of the algorithm shown in FIG. 15b;

FIG. 18 is a flow chart of a handleSimpleContent function of the algorithm shown in FIG. 15b;

FIG. 19 is a flow chart of a handleParticle function of the algorithm shown in FIG. 15a; and FIG. 20 is a flow chart of a handleModelGroup function of the algorithm shown in FIG. 19.

It will be noted that throughout the appended drawings, like features are identified by like reference numerals.

DETAILED DESCRIPTION OF THE PREFERRED EMBODIMENT

The invention provides a system and method for generating a wireless application from a web service definition. The system executes program code that embodies an algorithm which receives a web service operation definition and examines the input and output messages and data structures used in the messages to generate corresponding message and data definitions in the wireless application. Additionally, the algorithm outputs a mapping associating each wireless message with a web service message and each wireless data definition with a web service data definition. This mapping is used by a proxy located in a communications path between a wireless device and the web service to translate web service messages to a format used by the application running on the wireless device, and vice versa.

System Overview

Figure 2:
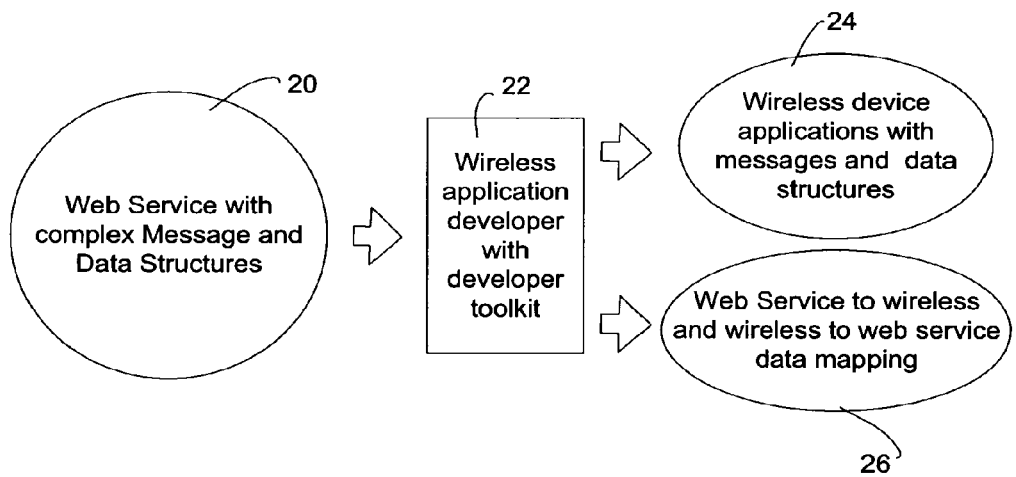
FIG. 2 is a schematic diagram illustrating a process for creating and enabling a system in accordance with the invention.

FIG. 2 is a schematic diagram illustrating a process for creating and enabling a system in accordance with the invention.

Figure 1:
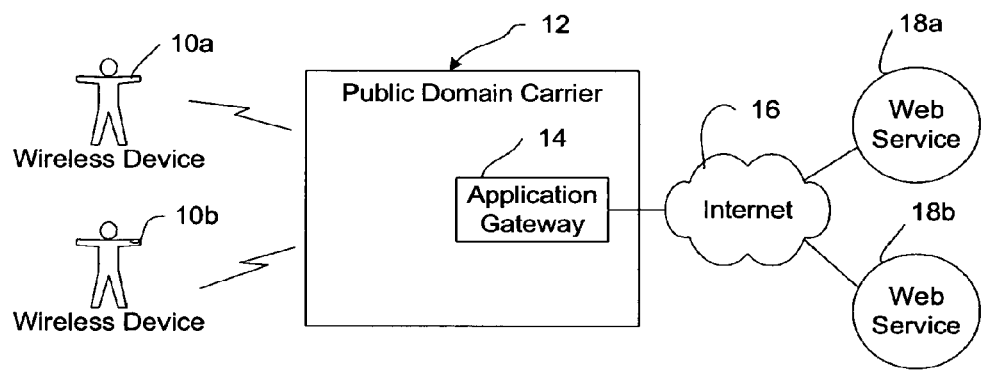
FIG. 1 is a block diagram of a prior art wireless network system.

A remote service accessed by the users 10a, 10b of wireless devices shown in FIG. 1, such as web service 20 uses complex message structures to communicate information to users who access the remote service. The web service 20 likewise uses complex data structures for data storage and data retrieval. A wireless application developer 22 uses a specification of the web service 20 and an application developer toolkit to create wireless device applications 24 and message maps 26 for enabling a system in accordance with the invention. The wireless device applications 24 with message formats and wireless data structures is created from a specification for the web service 20. As will be explained below with reference to FIGS. 7-19, the wireless data structures are created using an algorithm for generating a wireless application from a web service definition. The process involves mapping web service messages to wireless messages and data structures. The application developer 22 may then use an automated or semi-automated algorithm for simplifying message and data structures to improve wireless device efficiency and reduce wireless bandwidth usage.

The message mapping 26 is used by a proxy at an edge of the wireless network to convert the complex service messages to wireless messages before the wireless messages are sent wirelessly to the wireless device users 10a, 10b. In one embodiment of the invention the proxy that applies the data mapping 26 is an application gateway, as will be explained below with reference to FIGS. 3 and 5.

Figure 3:
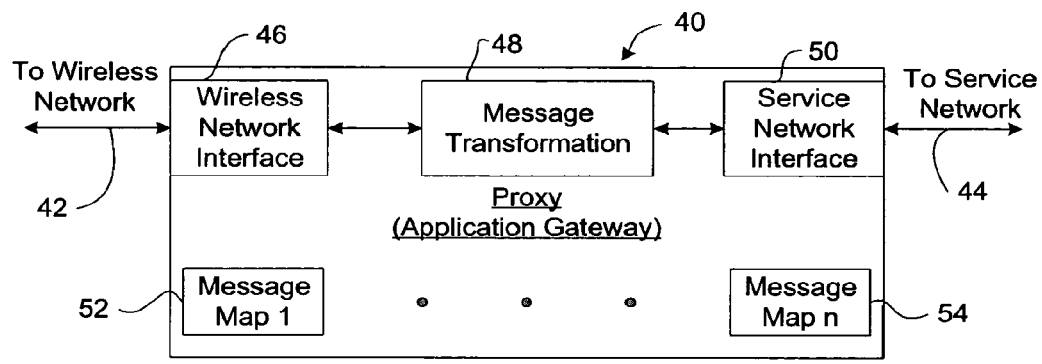
FIG. 3 is a block diagram of a proxy in accordance with the invention.

FIG. 3 is a block diagram of proxy 40 in accordance with the invention. The proxy 40 is located in a communications path between the wireless device 10a, 10b and the remote service, for example, a worldwide web service 18a, 18b. In one embodiment of the invention the proxy 40 is an application gateway, and is hereinafter referred to as the application gateway 40.

The application gateway 40 supports a wireless network interface 46 having a link 42 to the wireless network. A message transformation function 48 receives messages from the wireless network interface 46 and processes the messages before forwarding the messages to a service network interface 50. The service network interface 50 has a link to a service network 44 (the Internet, for example) over which it forwards the messages to an appropriate web service(s). In accordance with the invention, the application gateway 40 is provisioned with a plurality of message maps 52, 54. The message maps 52, 54 are created by the wireless application developer 22 using the algorithm in accordance with the invention, and used by the message transformation function 48 to process service request and service response messages, as will be explained below in more detail with reference to FIG. 5. One message map 52, 54 is created by the application developer 22 for each message type used by each web service 18a, 18b.

Figure 4:
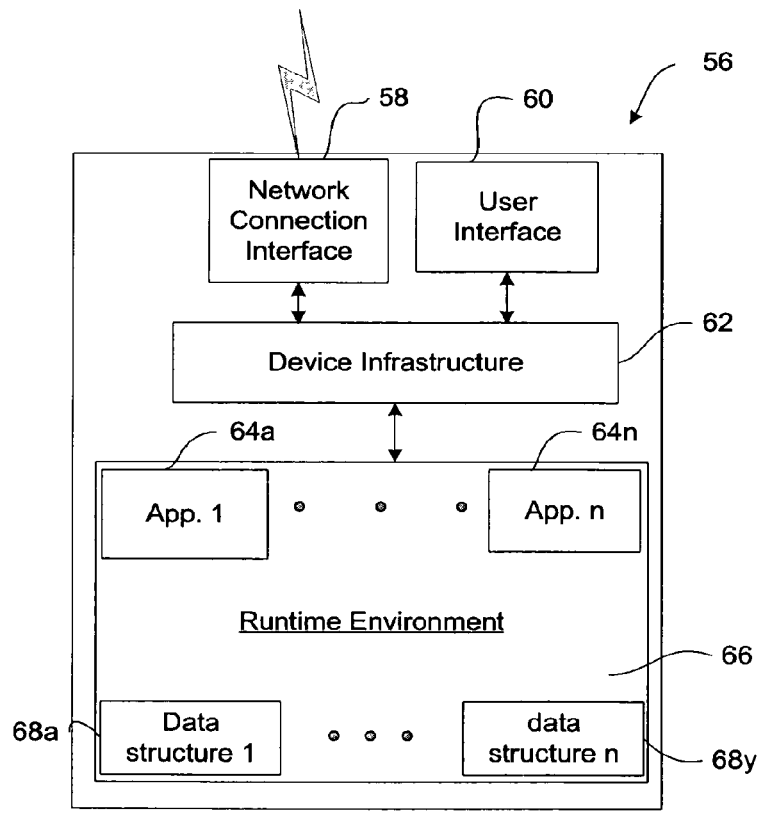
FIG. 4 is a block diagram of a wireless device in accordance with the invention.

FIG. 4 is a block diagram of a wireless device 56 in accordance with the invention. The wireless device 56 includes a network connection interface 58 that is well known in the art and used to communicate wirelessly with the public domain carrier 12. The wireless device 56 further includes a user interface 60, which may be a keypad, a touch sensitive screen, voice recognition software, or any other user interface for wireless devices. A device infrastructure 62 includes memory, processor(s), peripheral ports, keypad, display and other hardware components required to support the functionality of the wireless device 56. A runtime environment 66 supports a plurality of data structures 68a, 68n that store corresponding application data.

Operation Overview

Figure 5:
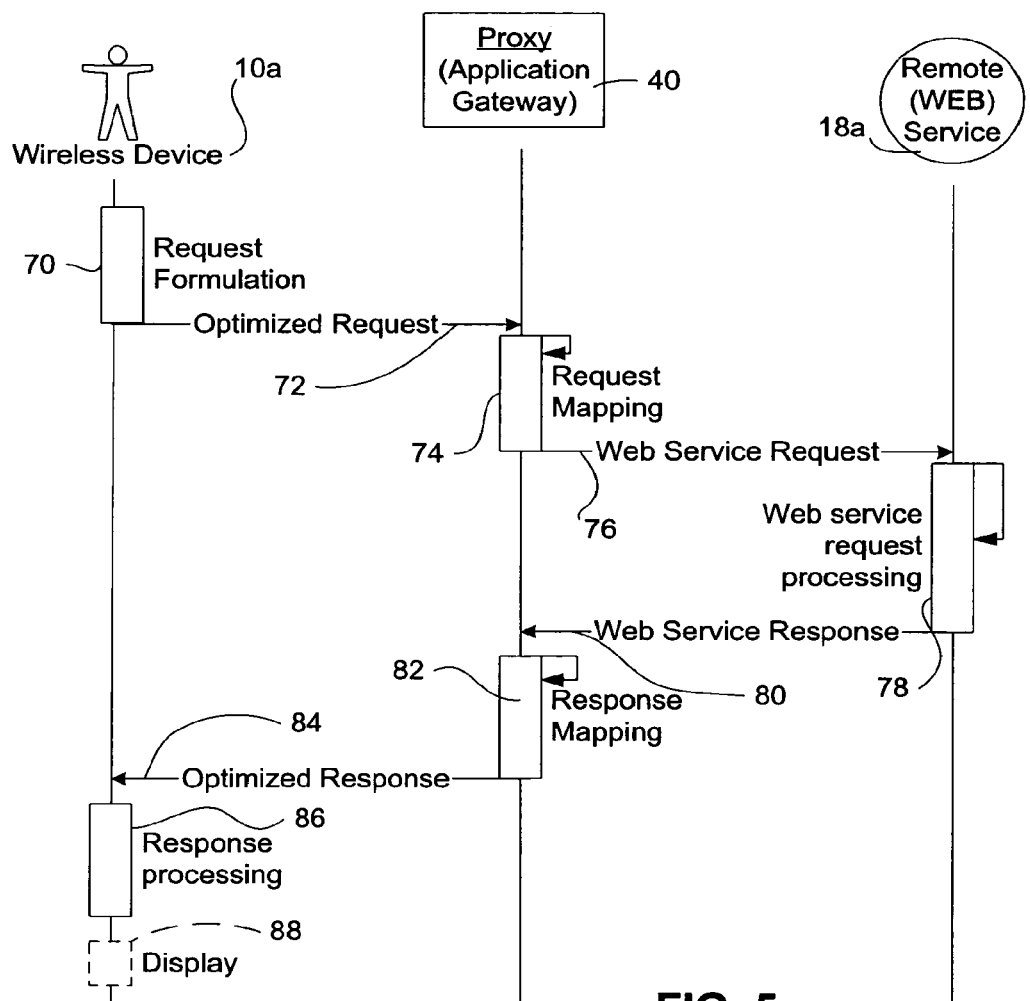
FIG. 5 is a high level overview of messaging between a wireless device and a remote service in a system in accordance with the invention.

FIG. 5 provides an overview of wireless messaging using wireless applications in accordance with the invention. In step 70 a wireless device user 10a formulates a service request message in a wireless format when the user 10a wishes to request a service from web service 18a. The service request message is forwarded (step 72) to the application gateway 40 which performs service request message mapping in step 74 to transform the service request message from the wireless format into a web service request message format required by the web service 18a. The application gateway 40 forwards the web service request message to the web service 18a (step 76), which receives the web service request message and processes the message in a manner well known in the art (step 78). The web service 18a then formulates and returns a web service response message (step 80). The application gateway 40 receives the web service response message, correlates the web service response message with the web service request message sent earlier, and performs web service response message mapping in step 82 to transform the web service response message into a response message in the wireless format used by the wireless device 10a. The application gateway 40 forwards the response message in the wireless format to the wireless device 10a in step 84. The wireless device 10a receives the service response message and performs service response message processing in step 86. The wireless device 10a may generate a display of information to the user in step 88, depending on a content of the service response message processed in step 86.

Application Generation Using a Web Service Definition

Figure 6:
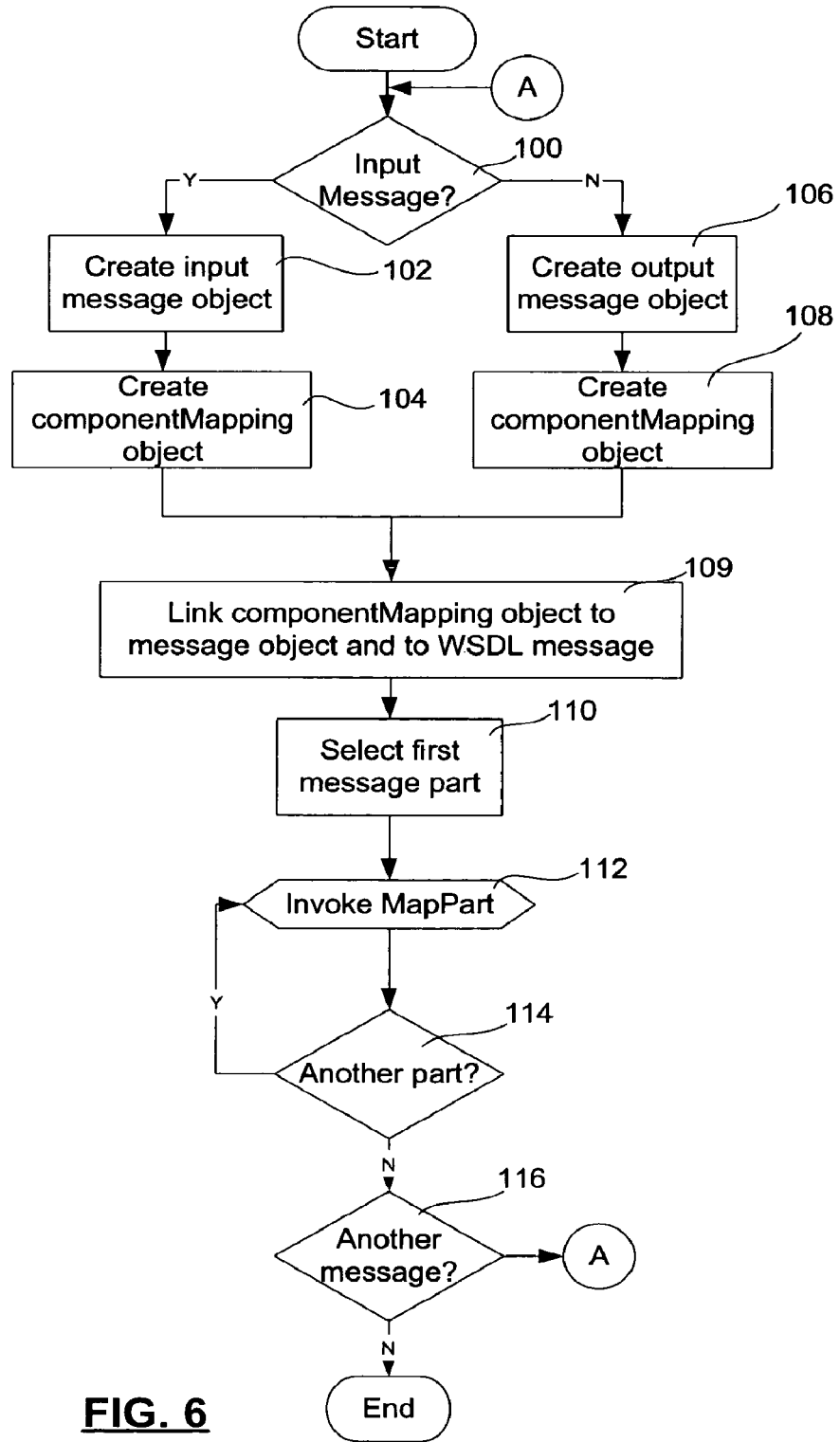
FIG. 6 is a flow chart of a mainline of an algorithm in accordance with the invention for creating a wireless application from a web service definition.

FIG. 6 is a flow chart of a mainline of an algorithm in accordance with the invention embodied in computer executable code for generating a wireless application from a web service definition. The algorithm shown in FIG. 6 is, for example, a part of the application developer toolkit 22 (FIG. 2). The algorithm accepts complex web service messages as input and outputs wireless service messages and message maps that permit the complex web service messages to be reconstructed using the wireless service messages and the message maps.

As shown in FIG. 6, the algorithm in accordance with the invention accepts messages defined by a web service definition and determines in step 100 whether a message specified by the web service definition is an input message or an output message. If the selected message is an input message, an input message object is created (step 102). Thereafter, the algorithm creates a componentMapping object in step 104 and links the componentMapping object to a message object and to a web service definition language (WSDL) message (step 109).

If it is determined in step 100 that the message is an output message, the algorithm creates an output message object (step 106). Thereafter, the algorithm creates a componentMapping object (step 108) and links the componentMapping object to a message object and to a WSDL message (step 109). The algorithm then selects the first message part (step 110) and invokes an algorithm function named mapPart (step 112). As is understood by those skilled in the art, the algorithm passes the message part information to the mapPart function. When the invoked mapPart function returns control to the mainline shown in FIG. 6, it is determined whether another message part exists (step 114). If so, the algorithm invokes the function mapPart (step 112). Otherwise, the algorithm determines in step 116 whether another message exists in the web service definition. If so, the algorithm returns to step 100. Otherwise, the application generation is complete and the algorithm terminates execution.

Figure 7:
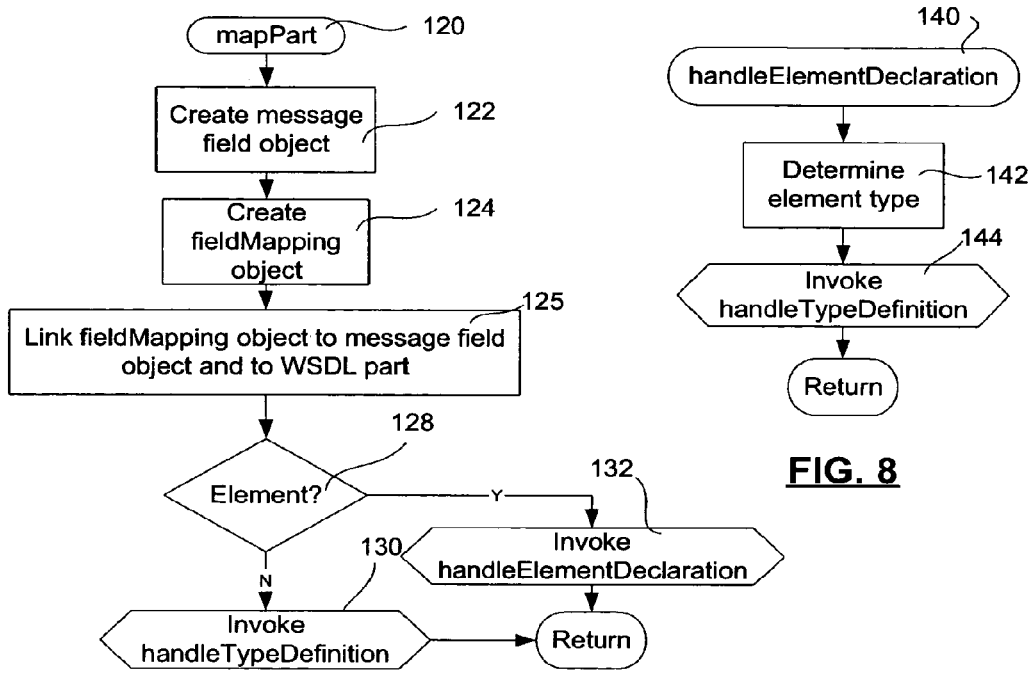
FIG. 7 is a flow chart of a mapPart function of the algorithm shown in FIG. 6.

FIG. 7 is a flow chart illustrating the algorithm function named mapPart. When mapPart is invoked in step 112, the algorithm branches to step 120 and a message field object is created in step 122. Subsequently, a fieldMapping object is created in step 124. The fieldMapping object is then linked to the message field object and to a WSDL part (step 125). It is then determined in step 128 whether the message part passed to the function is an element. If the message part is an element, handleElementDeclaration is invoked (step 132). Otherwise, handleTypeDefinition is invoked (step 130).

Figure 8:
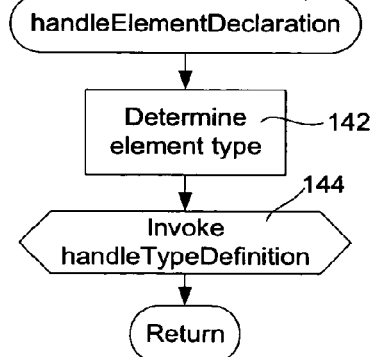
FIG. 8 is a flow chart of a handleElementDeclaration function of the algorithm shown in FIG. 7.

FIG. 8 is a flow chart illustrating the algorithm function handleElementDeclaration (140). In step 142, the algorithm determines the element type. The algorithm then invokes the algorithm function handleTypeDefinition (step 144), to which it passes the type definition information, and returns to step 132 of FIG. 7.

Figure 9:
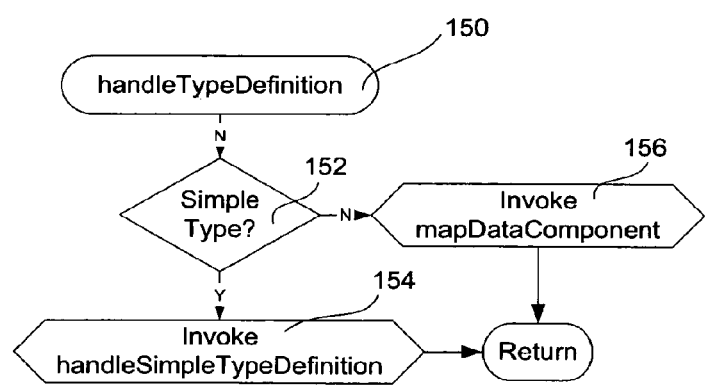
FIG. 9 is a flow chart of a handleTypeDefinition function of the algorithm shown in FIG. 8.

FIG. 9 is a flow chart illustrating the algorithm function handleTypeDefinition (step 150) branched to from step 130 of FIG. 7. In step 152 it is determined whether the type data component is a simple type. If so, the algorithm invokes the function handleSimpleTypeDefinition (step 154) to which it passes the simple type definition. If not, the algorithm invokes the function mapDataComponent (step 156), to which it passes the data component definition. Thereafter the algorithm returns to step 130 of FIG. 7.

Figure 10:
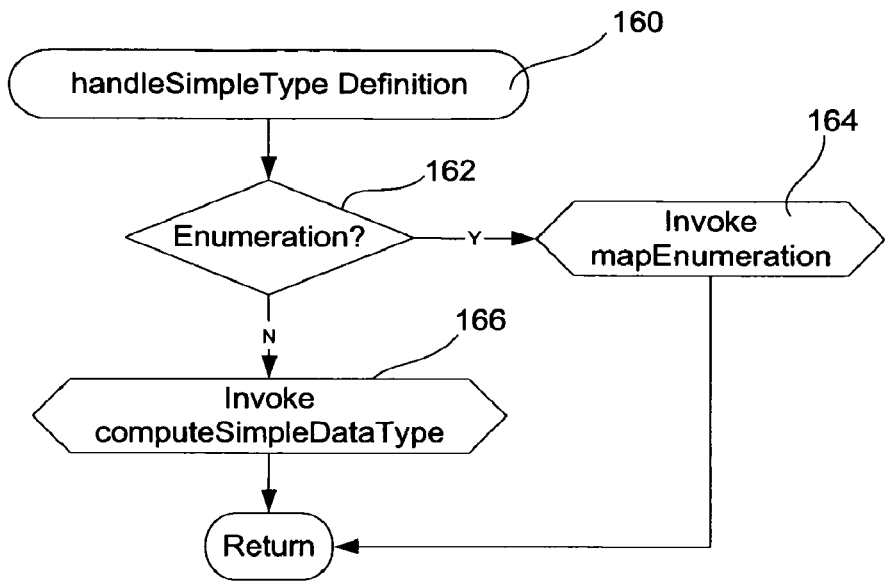
FIG. 10 is a flow chart of a handleSimpleTypeDefinition function of the algorithm shown in FIG. 9.

FIG. 10 is a flow chart illustrating the function handleSimpleTypeDefinition (160) invoked in step 154 of FIG. 9. In step 162 it is determined whether the simple data type is an enumeration. If so, the algorithm invokes the function mapEnumeration (step 164), to which it passes the enumeration definition. If not, the algorithm invokes the function computeSimpleDataType (step 166) to which it passes the simple data type definition. In either case, the algorithm then returns to step 154 shown in FIG. 9.

Figure 11:
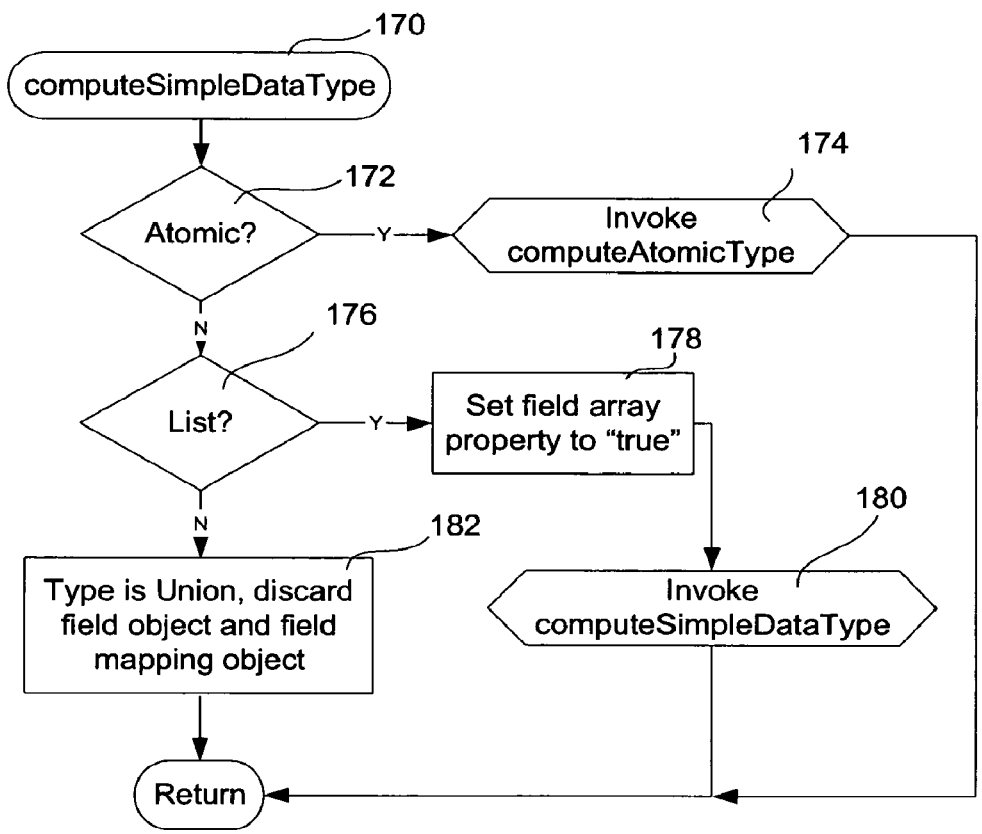
FIG. 11 is a flow chart of a computeSimpleDataType function of the algorithm shown in FIG. 10.

FIG. 11 is a flow chart showing the function computeSimpleDataType (170) invoked in step 166 of FIG. 10. In step 172 it is determined whether the simple data type is atomic. If so, the algorithm invokes the function computeAtomicType (step 174), to which it passes the Atomic type definition. If the simple data type is not atomic, it is determined in step 176 whether the simple data type is a list. If so, a field array property is set to "true" (step 178) and the algorithm branches back (step 180) to step 170 with the new parameter. If simple data type is neither atomic nor a list, the type is a union, which is not supported in wireless applications in accordance with the invention. Consequently, the field object and the field mapping object are discarded (step 182) and the algorithm returns to step 166 shown in FIG. 10.

FIG. 12 is a flow chart showing the algorithm function mapEnumeration (190) invoked in step 164 shown in FIG. 10. In step 192 an enumeration object is created. Thereafter, an enumerationMapping object is created (step 194), and the enumerationMapping object is linked to the enumeration object and to a simple type definition (step 195). For each enumeration value an enumeration literal object is then created and mapped (step 196). The algorithm then returns to step 164 shown in FIG. 10.

FIG. 13 is a flow chart illustrating computeAtomicType (200) invoked in step 174 shown in FIG. 11. In step 202, a corresponding data type is determined using a translation table in a manner well known in the art. The field is then updated based on the data type (step 204) and the algorithm returns to step 174 shown in FIG. 11.

FIG. 14 is a flow chart illustrating mapDataComponent (210) invoked in step 156 shown in FIG. 9. In step 212, the algorithm creates a data object, and then creates a componentMapping object (step 214). The algorithm then links the componentMapping object to the data object and to a complex type definition (step 215). The algorithm then invokes handleComplexTypeDefinition in step 216 and returns to step 156 shown in FIG. 7.

Figure 15A:
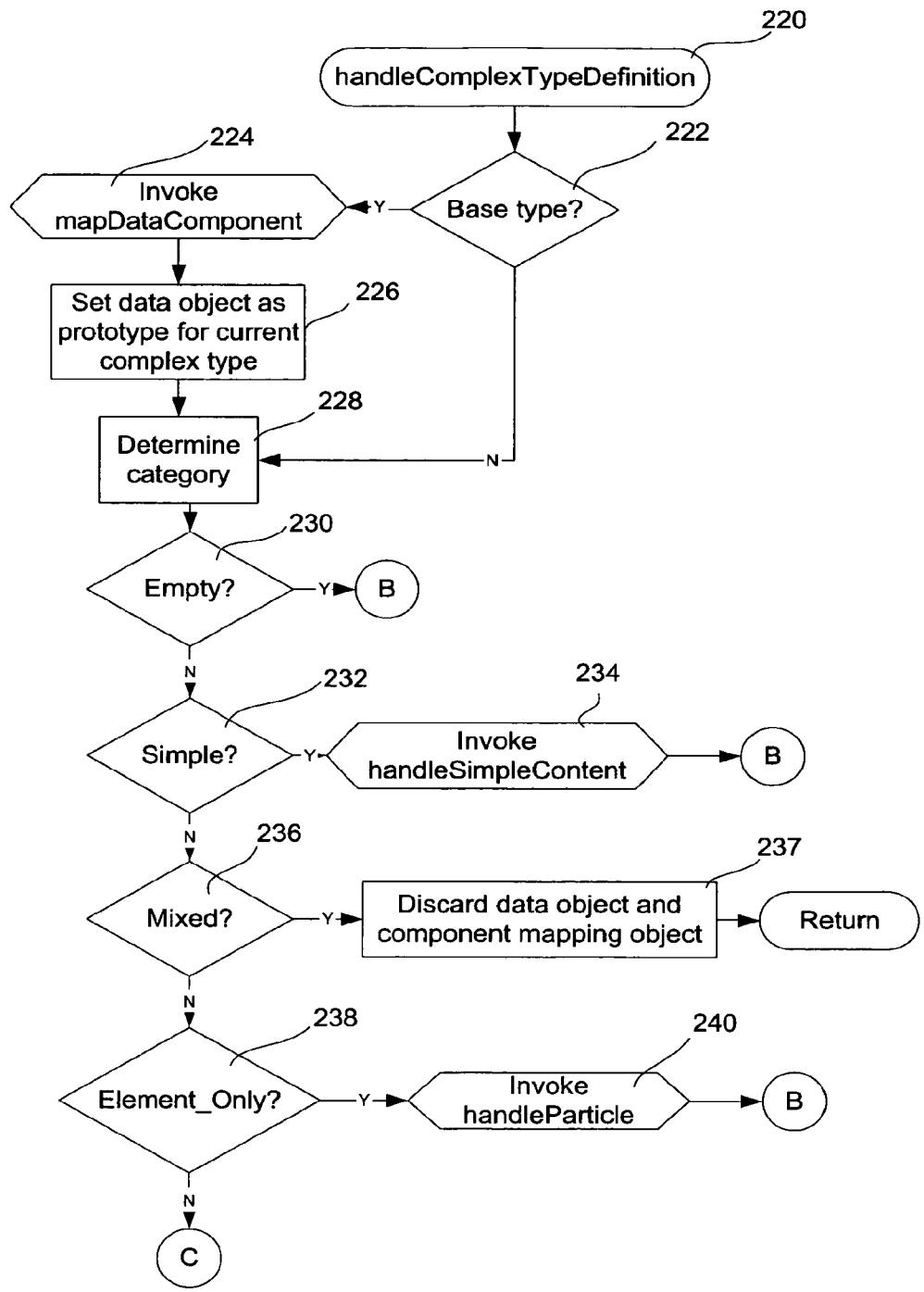
FIG. 15a is a flow chart of a handleComplexTypeDefinition function of the algorithm shown in FIG. 14.
Figure 15B:
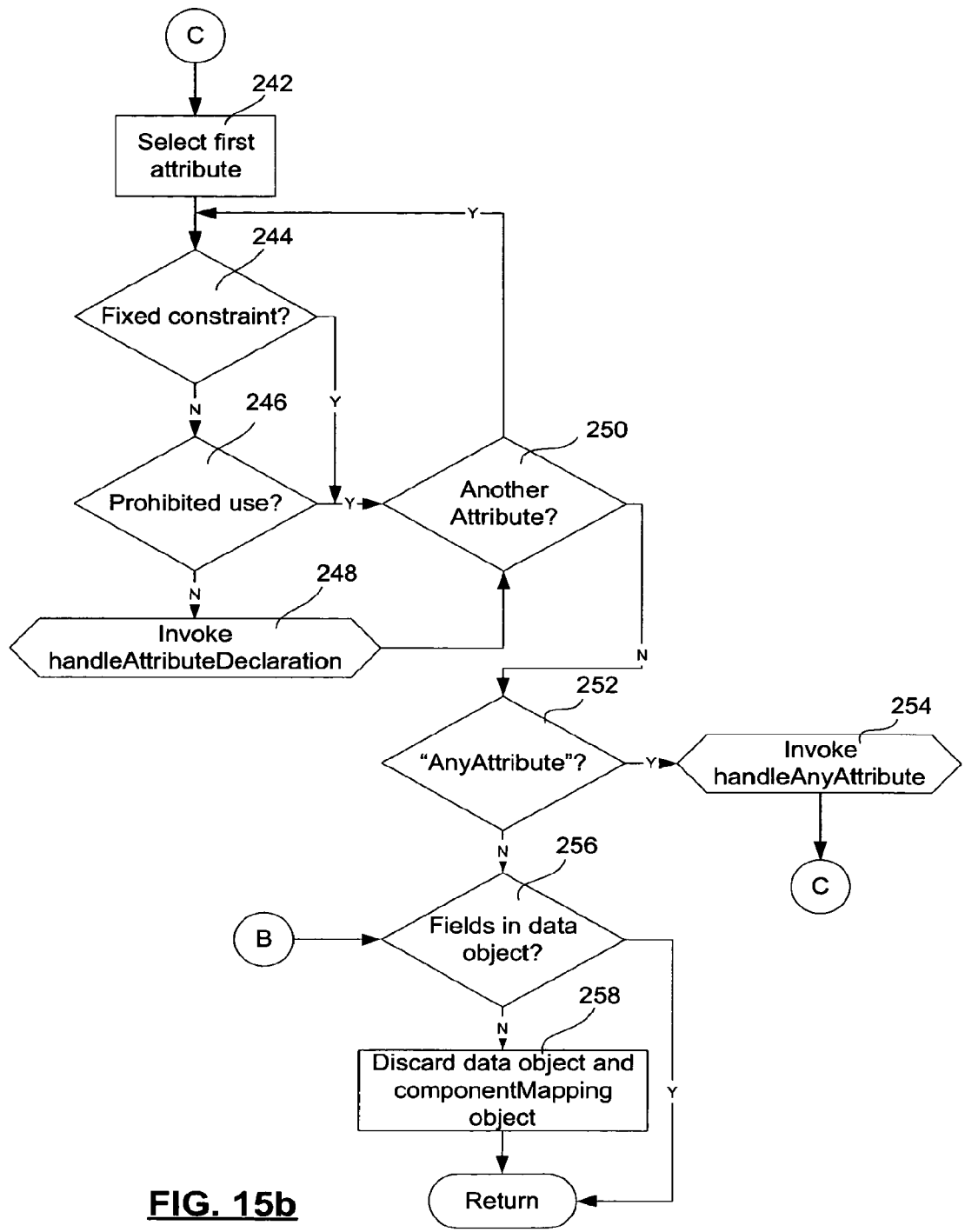

FIGS. 15a and 15b illustrate the algorithm function handleComplexTypeDefinition (220) invoked from step 216 shown in FIG. 14. In step 222 the algorithm determines whether the complex type definition has a base type. If so, the algorithm first invokes the function mapDataComponent (step 224) shown in FIG. 14, on the base type. The algorithm then sets the data object as a prototype for the current complex type (step 226) and in step 228 determines a category of the current complex type in a manner well known in the art. In step 230 it is determined whether the category is an empty type. If so, the algorithm branches to step 256 shown in FIG. 15b. If not, it is determined whether the category is a simple type (step 232). If so, the algorithm invokes the function handleSimpleContent (step 234) and branches to step 256 shown in FIG. 15b. If not a simple type, the algorithm determines whether the category is a mixed type (step 236). If so, the data object and componentMapping object are discarded (step 237) and the algorithm returns to step 216 shown in FIG. 14. If the category is not a mixed type the algorithm determines whether the category is Element_Only type (step 238). If so, the algorithm invokes handleParticle (step 240) and branches to stop 256 of FIG. 15b. If not, the algorithm selects a first attribute (step 242) and determines in step 244 if the attribute is a fixed constraint. If so, it is determined in step 250 whether there is another attribute and the process branches back to step 244. If the attribute is not a fixed constraint, it is determined in step 246 whether the attribute is a prohibited use. If so, it is determined in step 250 whether there is another attribute and the process branches back to step 244. If not, handleAttributeDeclaration is invoked in step 248 and the process branches to step 250. It is determined in step 252 whether the complex type has an "AnyAttribute" type. If so, the function handleAnyAttribute is invoked (step 254) and the complex type definition is passed to the function. If not, it is determined in step 256 whether there are any fields in the data object. If there are fields in the data object the algorithm returns to step 216 shown in FIG. 14. If there are no fields in the data object, the algorithm discards the data object and the componentMapping object (step 258) and returns to step 26 shown in FIG. 14.

FIG. 16 is a flow chart showing the portion of the algorithm named handleAttributeDeclaration (260) invoked from step 248 of FIG. 15b. In step 262, the algorithm creates a data field object and in step 264 the algorithm creates a fieldMapping object. Thereafter, the algorithm links the fieldMapping object to the data field object and to attribute declaration (step 265) and invokes handleSimpleTypeDefinition (step 266) shown in FIG. 10. The algorithm then returns to step 248 of FIG. 15b.

FIG. 17 is a flow chart of the portion of the algorithm function handleAnyAttribute (270) invoked from step 254 of FIG. 15b. In step 272, the algorithm creates a data field object and in step 274 creates a fieldMapping object. The algorithm then links the fieldMapping object to the data field object and to the anyAttribute (step 275) and sets the data field type to "string" (step 276). The algorithm then returns to step 254 of FIG. 15b.

FIG. 18 is a flow chart of an algorithm function called handleSimpleContent (278) in accordance with the invention. In step 279 the algorithm creates a data field object and in step 280 the algorithm creates a fieldMapping object, then determines the content type (step 281). The algorithm then invokes the function handleSimpleTypeDefinition (step 282) and passes the content type definition to it.

Figure 19:
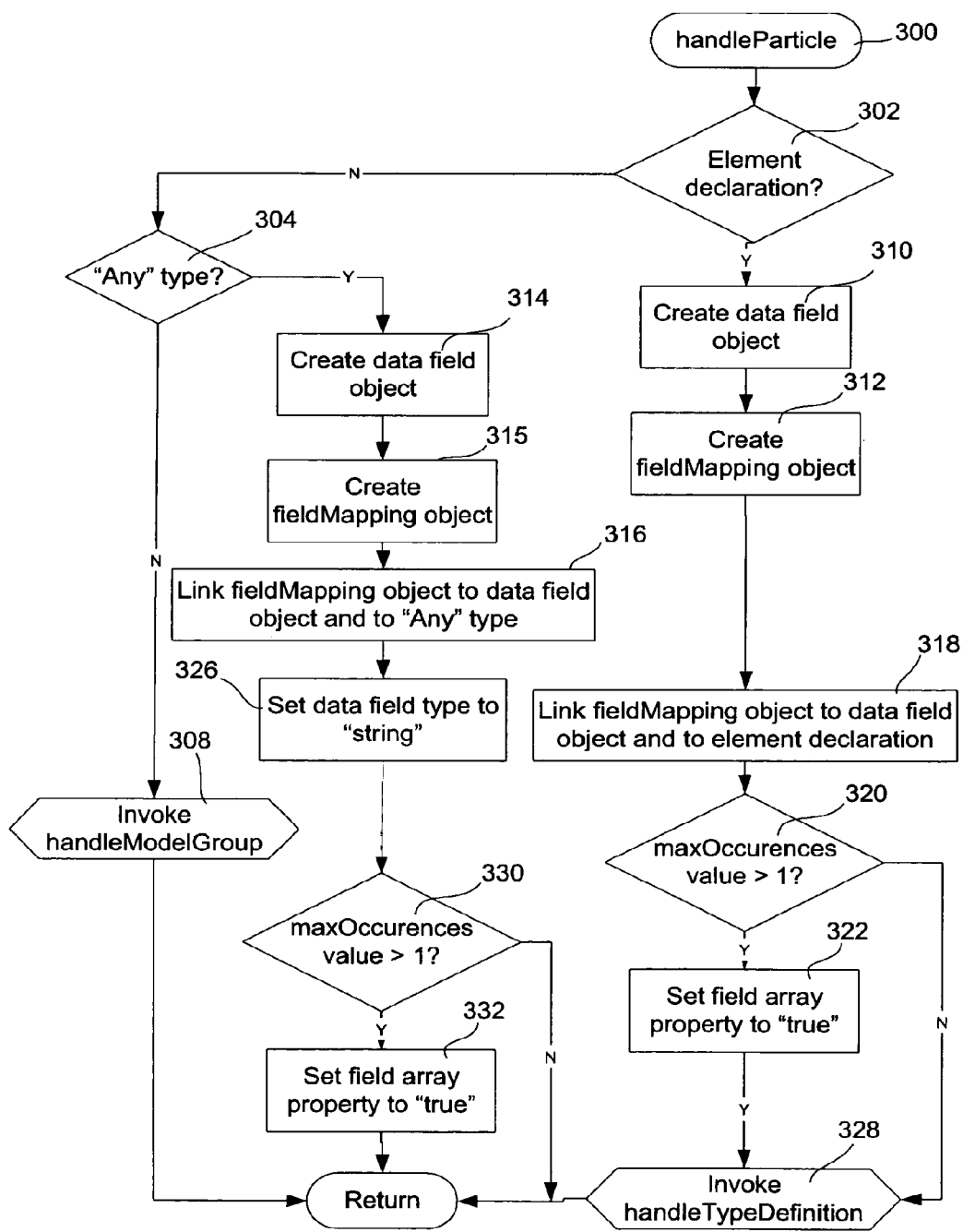

FIG. 19 is a flow chart of the algorithm function handleParticle (300) invoked from step 240 of FIG. 15a. In step 302, the algorithm determines whether the particle is an element declaration. If not, the algorithm determines whether the particle is "Any" type (step 304). If not an element declaration or an "Any" type, (step 306) the particle is a model group. If the particle is a model group, the algorithm invokes handleModelGroup (step 308).

If is was determined in step 302 that the particle is an element declaration, the algorithm creates data field object (step 310) and creates a fieldMapping object (step 312). The algorithm then links the fieldMapping object to the data field object and to the element declaration (step 318). It then determines whether the maximum occurrences is greater than one (step 320) and, if so, sets the field array property to "true" (step 328) and returns to step 240 of FIG. 15a.

Otherwise, if the particle is determined to be "Any" type (step 304), the algorithm creates a data field object (step 314), creates a field mapping object (step 315), and the algorithm links the fieldMapping object to the data field object and to an "Any" type (step 316). The algorithm then sets the filed type to "string" (step 326), and determines whether a maximum number of occurrences is greater than one (step 330). If not, the algorithm returns to step 240 of FIG. 15a. Otherwise, the algorithm sets a field array property to "true" (step 332). The algorithm then returns to step 240 in FIG. 15a.

FIG. 20 is a flow chart illustrating handleModleGroup (283) invoked from step 308 of FIG. 18. In step 284, the algorithm selects a first particle in the model group. The algorithm then invokes (step 285) handleParticle (300) shown in FIG. 19. The algorithm then determines in step 286 whether there is another particle in the model group. If so, the algorithm once again invokes handleParticle (step 285) and this process reiterates until all particles in the model group have been processed. Thereafter, the algorithm returns to step 308 of FIG. 19, and subsequently to step 240 of FIG. 15a.

As will be understood by those skilled in the art, the algorithm set forth above creates a wireless device application from a web service definition. As will be further understood by those skilled in the art, wireless device resources are limited as is data transfer bandwidth available for wireless communications. The data structures and messages created by the algorithm described above with reference to FIGS. 6-19 are therefore preferably simplified by flattening complex data structures and using other methods of field size and message complexity reduction as described in Applicant's co-pending patent applications related wireless message and data simplification.

As will be further understood by those skilled in the art, the above-described algorithm represents only one way in which a wireless application may be generated using a web service definition. The algorithm described above with reference to FIGS. 6-19 is therefore intended to be exemplary only. The scope of the invention is therefore intended to be limited solely by the scope of the appended claims.

We claim:

1. A method for generating a wireless application from a definition of a web service, the method being performed by a processor, the method comprising:

receiving input signals representing the definition of the web service, the definition defining a plurality of web service messages;

creating a message object and a component mapping object for each one of the plurality of web service messages, each one of the plurality of component mapping objects providing mapping between each respective one of the plurality of web service messages and a respective one of the plurality of wireless application messages;

linking each one of the plurality of component mapping objects to the respective one of the plurality of message objects and to the respective one of the plurality of web service messages; and generating a data structure representing the wireless application, the wireless application including the plurality of component mapping objects;

wherein the component mapping object maps message parts of each one of the plurality of web service messages to respective message parts of each respective one of the plurality of wireless application messages; and wherein creating each component mapping object comprises creating a message field mapping object and a field mapping object for each message part of each web service message, and linking each component mapping object comprises linking each field mapping object to the respective message field object and the respective web service message part.

2. The method as claimed in claim 1 further comprising:

selecting a message part;

determining whether the message part is an element declaration;

determining the element type if the message part is an element declaration; and determining whether the message part is a simple data type, an enumeration or a complex type.

3. The method as claimed in claim 2 wherein upon determining that the message part is a simple data type, the method further comprises determining whether the simple data type is an atomic type, a list or a union.

4. The method as claimed in claim 3 wherein upon determining that the simple data type is an atomic type, the method comprises determining a corresponding data type using a translation table and updating the message field object based on the data type.

5. The method as claimed in claim 3 wherein upon determining that the simple data type is an enumeration, the method further comprises:

creating an enumeration object;

creating an enumeration mapping object;

linking the enumeration mapping object to the enumeration object and to a simple data type definition; and for each enumeration value, creating an enumeration literal object and mapping it.

6. The method as claimed in claim 2 wherein upon determining that the message part is a complex type, the method further comprises:

creating a data object;

creating a component mapping object;

linking the component mapping object to the data object and to a complex type definition; and determining whether the complex type has a base type.

7. The method as claimed in claim 6 wherein upon determining that the complex type has a base type, the method further comprises:

creating a data object;
creating a component mapping object;
linking the component mapping object to the data object and to a complex type definition;
setting the data object as a prototype for a current complex type; and
determining a category of the complex type.

8. The method as claimed in claim 7 further comprising:
determining whether the category is one of an empty, simple, mixed or element only;
if the category is one of the empty, simple or element only, determining whether there are any fields in the data object; and
if there are no fields in the data object, discarding the data object and the component mapping object.

9. The method as claimed in claim 8 wherein upon determining that the category is mixed, the method comprises discarding the data object and the component mapping object.

10. The method as claimed in claim 8 wherein upon determining that the category is not one of the empty, simple, mixed or element only, the method further comprises:
selecting an attribute of the complex type; and
determining whether the attribute is one of a fixed constraint and a prohibited use.

11. The method as claimed in claim 10 wherein upon determining that the attribute is not a fixed constraint or a prohibited use, the method further comprises:
creating a data field object;
creating a field mapping object;
linking the field mapping object to the data field object and to an attribute declaration; and
determining whether the attribute declaration is an enumeration or a simple data type.

12. The method as claimed in claim 8 wherein upon determining that the complex type has an "Any" attribute the method further comprises:
creating a data field object;
creating a field mapping object;
linking the field mapping object to the data field object and to the "Any" attribute;
setting the data field type to "string";
determining whether there are any fields in the data object; and
discarding the data object and the component mapping object if the data object contains no fields.

13. The method as claimed in claim 8 wherein upon determining that the category type is simple, the method further comprises:
creating a data field object;
creating a field mapping object;
determining a content type of the simple category; and
determining whether the content is an enumeration or a simple data type.

14. The method as claimed in claim 8 wherein upon determining that the category type is element only, the method further comprises determining whether a particle of the category is an element declaration, and "Any" type or a model group.

15. The method as claimed in claim 14 wherein upon determining that the particle is an element declaration of "Any" type, the method further comprises:
creating a data field object;
creating a field mapping object;
linking the field mapping object to the data field object and to the "Any" type; setting the date field type to "string";
determining a maximum occurrences value of the particle; and
if the maximum occurrences value is greater than one, setting a field array property to "true".

16. The method as claimed in claim 15 wherein upon determining that the particle is a model group, the method further comprises:
for each particle in the model group:
creating a data field object;
creating a field mapping object;
linking the field mapping object to the data field object and to one of the element declaration and the "Any" type;
determining the maximum occurrences value of the particle;
if the maximum occurrences value is greater than one, setting a field array property to "true"; and
if the category type is "Any", setting the date field type to "string".

17. The method as claimed in claim 16 wherein upon determining that the maximum occurrences is 1 and the particle is an element declaration, the method further comprises:
determining whether the particle is a simple type.

18. The method as claimed in claim 1 further comprising determining whether each web service message is an input or an output message for the web service and creating an input message object or an output message object accordingly.

19. A system for generating a wireless application from a definition for a web service, comprising an application developer workstation, the system being configured for:
receiving input signals representing the definition for the web service, the definition defining a plurality of web service messages;
creating a message object and a component mapping object for each one of the plurality of web service messages, each one of the plurality of component mapping objects providing mapping between each respective one of the plurality of web service messages and a respective one of the plurality of wireless application messages;
linking each one of the plurality of component mapping objects to the respective one of the plurality of message objects and to the respective one of the plurality of web service messages; and
generating a data structure representing the wireless application, the wireless application including the plurality of component mapping objects;
wherein the component mapping object maps message parts of each one of the plurality of web service messages to respective message parts of each respective one of the plurality of wireless application messages; and
wherein creating each component mapping object comprises creating a message field mapping object and a field mapping object for each message part of each web service message, and linking each component mapping object comprises linking each field mapping object to the respective message field object and the respective web service message part.

20. A vendible product for generating a wireless application from a definition for a web service, the product comprising a computer readable memory storing:
computer executable code for accepting as input web service messages, determining whether each web service message is an input or an output message, computer executable code for receiving input signals representing the definition of the web service, the definition defining a plurality of web service messages;
computer executable code for creating a message object and a component mapping object for each one of the plurality of web service messages, each one of the plurality of component mapping objects providing mapping between each respective one of the plurality of web service messages and a respective one of the plurality of wireless application messages;

computer executable code for linking each one of the plurality of component mapping objects to the respective one of the plurality of message objects and to the respective one of the plurality of web service messages; and computer executable code for generating a data structure representing the wireless application, the wireless application including the plurality of component mapping objects;

wherein the component mapping object maps message parts of each one of the plurality of web service messages to respective message parts of each respective one of the plurality of wireless application messages; and wherein creating each component mapping object comprises creating a message field mapping object and a field mapping object for each message part of each web service message, and linking each component mapping object comprises linking each field mapping object to the respective message field object and the respective web service message part.

* * * * *